United States Patent
Li et al.

(10) Patent No.: US 7,839,383 B2
(45) Date of Patent: Nov. 23, 2010

(54) WEARABLE SIGNAL INPUT APPARATUS FOR DATA PROCESSING SYSTEM

(75) Inventors: Zhongqing Li, Beijing (CN); Xiaowen Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 952 days.

(21) Appl. No.: 11/660,321

(22) PCT Filed: Jul. 11, 2005

(86) PCT No.: PCT/CN2005/001019

§ 371 (c)(1),
(2), (4) Date: Feb. 15, 2007

(87) PCT Pub. No.: WO2006/021135

PCT Pub. Date: Mar. 2, 2006

(65) Prior Publication Data

US 2008/0042995 A1  Feb. 21, 2008

(30) Foreign Application Priority Data

Aug. 27, 2004 (CN) .................... 2004 1 0057164

(51) Int. Cl.
  *G09G 5/00* (2006.01)
(52) U.S. Cl. ........................ 345/156; 463/37
(58) Field of Classification Search ......... 345/156–166, 345/168, 173; 463/37; 341/21, 22, 23
  See application file for complete search history.

(56) References Cited

U.S. PATENT DOCUMENTS 5,764,219 A * 6/1998 Rutledge et al. ............ 345/159
6,642,857 B1 * 11/2003 Schediwy et al. ............. 341/20
6,850,224 B2 * 2/2005 Baughman ................... 345/163
7,042,438 B2 * 5/2006 McRae et al. ................ 345/156
2004/0080493 A1 * 4/2004 Kenin .......................... 345/163

FOREIGN PATENT DOCUMENTS

| CA | 2450494 A | 1/2003 |
|---|---|---|
| CN | 2388646 Y | 7/2000 |
| CN | 1404007 A | 3/2003 |
| CN | 2404007 A | 3/2003 |
| JP | 2001-242986 A | 9/2001 |

* cited by examiner

Primary Examiner—Quan-Zhen Wang
Assistant Examiner—Tom V Sheng
(74) Attorney, Agent, or Firm—Dickstein Shapiro LLP

(57) ABSTRACT

The present invention discloses a wearable signal input apparatus for a data processing system comprising a wearable unit at least having a index finger sleeve and a middle finger sleeve; a position sensing unit located on said wearable unit for detecting a movement of the index finger and generating a corresponding displacement signal; a first and a second buttons respectively located on the index finger sleeve and the middle finger sleeve of said wearable unit for generating button signals; a signal processing unit provided on said wearable unit for receiving said displacement signal and said button signals and converting said signals into signals which are recognizable by a signal processing system; a signal transmission unit connected to said signal processing unit for transmitting said recognizable signals to said signal processing system; an input switch unit provided on said wearable unit and connected to said signal processing unit for turning said signal input apparatus on/off. The present invention may conveniently achieve the switching interoperation with other input devices and improve efficiency of the signal inputs.

12 Claims, 8 Drawing Sheets

WEARABLE SIGNAL INPUT APPARATUS FOR DATA PROCESSING SYSTEM

BACKGROUND OF THE INVENTION

1. Field of Invention

The present invention relates to signal transmission and processing techniques, and more particularly, to a wearable signal input apparatus for a data processing system.

2. Description of Prior Art

Generally, it is always necessary for a data processing system such as desktop computer, portable computer, sever and mainframe computer to be equipped with input/output devices for human-machine interacting signals, for example, mouse, keyboard and display screen. The mouse was given its birth in 1964 and is mainly used to obtain a position input on X and Y axes, sometimes, a Z axis is additionally added. By combining a mouse with a keyboard and displaying contents such as a cursor as well as characters and graphics on a display screen, the input of the positions and characters information can be implemented conveniently.

Referring to FIG. 1, a general desktop computer used nowadays includes a host 110, a display screen 120 for displaying various information to a user, a mouse 130 and a keyboard 140 for implementing signal inputs. The mouse 130 and the keyboard 140 can be connected to the host 110 in a wired or wireless manner.

However, there are some disadvantages existing in the conventional signal input devices by observing the using procedure of the keyboard 140 and the mouse 130 by a user. The keyboard 140 and the mouse 130 can not simultaneously operate well, therefore, the user needs to move his hand away from the keyboard 140 to touch the mouse 130, and then performs a displacement signal input operation. Sometimes the distance of this movement near, but sometimes it is far. After the operation of the mouse 130 is finished, the user needs to move his hand back to the keyboard 140 from the mouse 130 during which the user has to firstly touch his index finger onto a positioning key of the keyboard 140 (generally, "F" and "J" keys), or with the direct aids of his eyes, directly find a desired key, and then the further character input operation is kept on going. In actual operations, the character input and the position input are frequently switched, which in turn requires the user to move his hand back and forth between the keyboard 140 and the mouse 130 frequently. However, it is a common case that sometimes the hand of the user fails to find the mouse so that the user has to move his eyes off the screen to find the mouse or the desired key. Therefore, a time break is produced due to the eyes off from screen during switching or hand moving and thus reduces the efficiency of the input operation.

Referring to FIG. 2, for a notebook or a portable computer, the keyboard 140 as well as a transforming track point 150 and a touch panel 160, etc., are all integrated in the host 111. Although the track point 150 is directly embedded into the keyboard 140, the distance of the hand's movement during the operation can be shortened. However, because two buttons (not shown) interoperating with the track point 150 is far from the keyboard, the thumb is required to interoperate for operating these buttons while the index finger operates the track point 150. Therefore, the efficiency of the input operation still needs to be improved. The touch panel 160 is far from the keyboard, and therefore, the fingers need to be completely moved off the keyboard 140 to operate on the touch panel 160 during switching, vise versa. As a result, the switching efficiency thereof is lower than that of the track point 150. Most users are get used to a common mouse, so when they are using the notebook computer, a mouse is additionally plugged in the computer for easy using. No matter which manner is adopted, the existing schemes will influence the switching efficiency.

Additionally, with the development for many years, various mice of different types are proposed in the prior art. For example, CN Patent Application No. 02137574.7 discloses a finger-wearing pressure induction type of an optical mouse; CN Patent No. 02229039.7 discloses a technique solution in which the wheel of the mouse is provided on a finger sleeve and is rotated by a thumb; in US Patent No. 2004012564, an X-Y input sensor is provided on a device like a glove; in US Patent No. 2003174124 and No. 2002101401, the buttons of the mouse are all located on one thumb, and the operations are performed with aids of other fingers; in U.S. Pat. No. 5,706, 026, the buttons are positioned on joints of fingers; in US Patent No. 2003038783, the wheel is properly placed at the edge of the palm, and the buttons are provided on the index finger and the middle finger; in DE Patent No. 10040812, the sensors of the mouse are just positioned on two fingers.

However, in all the above or other similar patent applications, there is one disadvantage in common, that is, when designing the mouse, the key pressing operations of the keyboard are not collectively considered, and thus the efficiency of switching between the mouse and the keyboard inputs by a user can not be improved. For example, US Patent No. 2003174124 and No. 2002101401 can hardly implement the switching, since at lease one finger is completely occupied by the mouse such that it can not participate into the keyboard inputs; in DE Patent No. 10040812, a ring sensor is provided on a finger and expose the tip of the finger so that the normal keyboard input operation can be performed with this finger, and when moving off the keyboard, the mouse is just on the tip of the finger, so it is no need to take a while to find the mouse. However, in order to avoid malfunctions among the position input and the character input, the full palm has to be moved from the keyboard to the operation board to make the position input operation of the mouse, and therefore, the input efficiency thereof still needs to be improved; in U.S. Pat. No. 5,706,026, the user's hand can be only used as a mouse, and if it is used for the keyboard operation simultaneously, a malfunction will be prone to occur, because a position input malfunction will occur when characters are to be input, causing the cursor to be deviated from the original predetermined position.

One conventional input device can be found in CA Patent No. 2450494 (FIG. 3 of this application). The input device 200 includes track means 210 located on the tip of the index finger for generating a displacement signal; pressure plates 220 located on the middle finger and the ring finger for generating button signals; and a transmitter 230 for transmitting the displacement signal and the button signals to a computer, and further includes a scroll/page button 240 located at the edge of the index finger. The disadvantages thereof are as the follows. Firstly, the user's hand can only be used as a mouse, and if it is used for the keyboard operation simultaneously, a malfunction will be prone to occur, because when characters are to be input, the track means 210 is prone to generate a position input malfunction due to the movement of the index finger on the keyboard, thereby the cursor deviates from the original predetermined position. Secondly, when the middle finger and the ring finger press the keyboard, the pressure plates 220 are prone to generate fault mouse button signals. Thirdly, in the conventional mouse operation, the user gets used to manipulate the left button with his index finger and manipulate the right button with his middle finger, but in this patent, the pressure plates are positioned at the middle finger and the ring finger, which will result in malfunctions of the user, so that the working efficiency will be influenced. Finally, in this patent, the scroll/page button 240 positioned at the edge of the index finger is used to perform a page up/down operation, which is also distinct from the conventional wheel operation manner and thus the user will feel not familiar and inconvenient.

SUMMARY OF THE INVENTION

The technical problem to be solved by the present invention is to provide a signal input apparatus for a data processing system, which is able to conveniently achieve the switching interoperation with other input devices and improve efficiency of signal inputs.

To this end, the technical solution of the present invention for solving the above technical problems is to provide a wearable signal input apparatus for a data processing system comprising:

a wearable unit at least having an index finger sleeve and a middle finger sleeve;

a position sensing unit located on said wearable unit for detecting a movement of the index finger and generating a corresponding displacement signal;

a first and a second buttons respectively located on the index finger sleeve and the middle finger sleeve of said wearable unit for generating button signals;

a signal processing unit provided on said wearable unit for receiving said displacement signal and said button signals and converting said signals into signals which are recognizable by a data processing system;

a signal transmission unit connected to said signal processing unit for transmitting said recognizable signals to said data processing system;

an input switch unit provided on said wearable unit and connected to the signal processing unit for turning said signal input apparatus on/off.

Preferably, said input switch unit is located at the side of the index finger sleeve of said wearable unit such that the thumb presses said input switch unit.

Preferably, said position sensing unit is located on the index finger sleeve of said wearable unit, and includes a light source for generating an original light signal; a lens for acquiring a reflected light signal; a sensor for generating a position signal according to said reflected light signal, wherein an emission direction and an emission angle of the light source are just located at a position optimizing the lens' acquisition of the reflected light.

Preferably, said position sensing unit and said first button are integrally packaged.

Preferably, said position sensing unit includes a light source and a sensor integrated into the signal processing unit; a lens located on the index finger sleeve of the wearable unit; and optical fibers for transmitting an original light signal generated by the light source to the index finger and transmitting a reflected light signal acquired by the lens to the sensor.

Preferably, said position sensing unit is a magnetic inducing element, an optical scanning sensing element or a capacitance sensing element.

Preferably, it further comprises a page unit located on the index finger sleeve or the middle finger sleeve of said wearable unit for generating a page up/down operation signal.

Preferably, said page unit includes a light source, a wheel, a third button, an integrated optical encoder and a first cradle, and an integrated light source and a second cradle.

Preferably, said first, second and third buttons are contacting or sensing buttons.

Preferably, said signal transmission unit is integrated into the signal processing unit.

Preferably, said signal transmission unit is a wireless or infrared transmission unit.

Superior to the conventional techniques, the present invention has the following advantages. Firstly, since the signal input apparatus of the present invention has an input switch unit, it can be operated to turn the signal input apparatus on/off, such that it is turned on when a position signal is to be input, and turned off when a keyboard operation is to be performed. Therefore, the possibility of malfunctions can be reduced and thus the efficiency of the user switching between the mouse and the keyboard inputs is easily improved. Secondly, since the first button and the second button are respectively located on the index finger sleeve and the middle finger sleeve in the present invention, it matches with the habits of the user, i.e., the index finger and the middle finger are respectively used for the confirmation and cancellation operations and so on. Thirdly, since the signal input apparatus is located on the hand by employing the wearable unit, when switching between the character input and the position input, the finger moves the shortest distance, and thus the switching speed is fastest. Moreover, in any cases, no assistant operation of the eyes is required so that the user only needs to watch the screen or other desired place without any requirements of looking at the keyboard and the signal input apparatus. Consequently, the present invention has a fast switching speed and a short movement distance, and may improve the working efficiency, especially for a situation where the graphics and texts are collectively input so that frequent switching is required.

Additionally, a wheel can be easily added to further implement operations such as page up/down, thereby the functionality of the signal input apparatus can be extended and also matches the habits of most users.

Furthermore, the signal input apparatus can be conveniently kept clean and can protect the fingers from contacting with the common-used computers so as to reduce the cross-infection of bacteria due to the using of the common-used computers. This is because the present invention has fewer gaps than prior arts such that the dust and water will not enter, the proliferation of the bacteria will be suppressed so that the possibility of infecting diseases will be reduced. The present invention has a small volume and thus is easy to be carried. The wearable unit may be made of flexible materials and thus is foldable. Moreover, the fingers are used as a mouse with flexible movements and inputs so that the wrist is released from injuries due to the long time use of the mouse.

DETAILED DESCRIPTION OF PREFERRED EMBODIMENTS

The technical solution of the present invention senses the displacement with a non-mechanical-contacting method, such as using optical information or information on magnetic fields, and at the same time, replaces the existing mouse entity with the index finger and the middle finger which are the most flexible fingers, and it can be placed on the fingers of either left hand or right hand.

Figure 1:
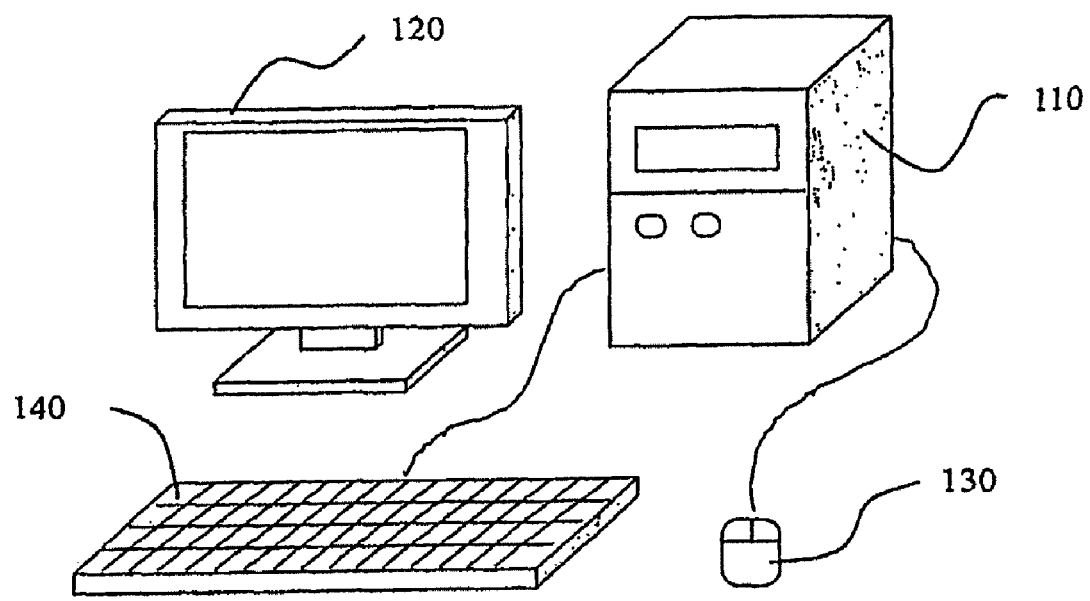
FIG. 1 is a schematic diagram of one signal input apparatus according to the prior art.
Figure 2:
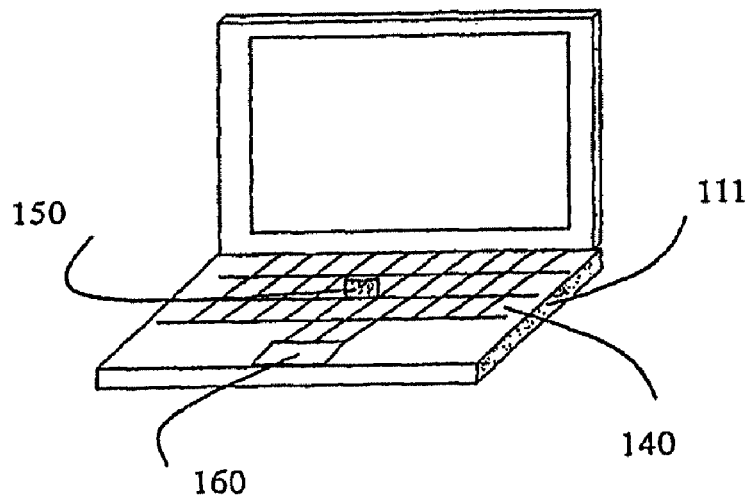
FIG. 2 is a schematic diagram of another signal input apparatus according to the prior art.
Figure 3:
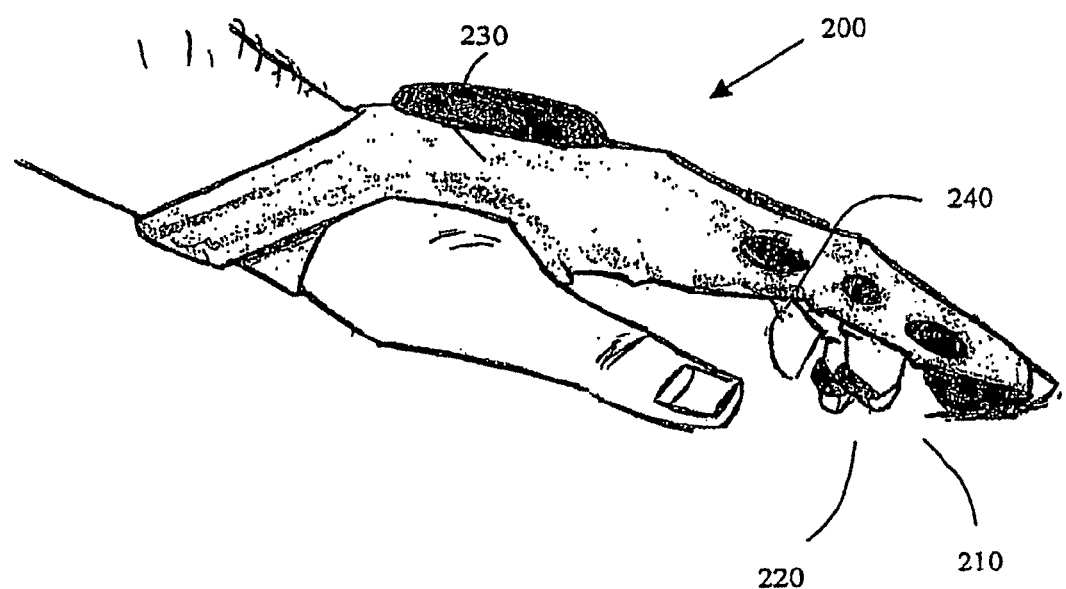
FIG. 3 is a schematic diagram of still another signal input apparatus according to the prior art.
Figure 4:
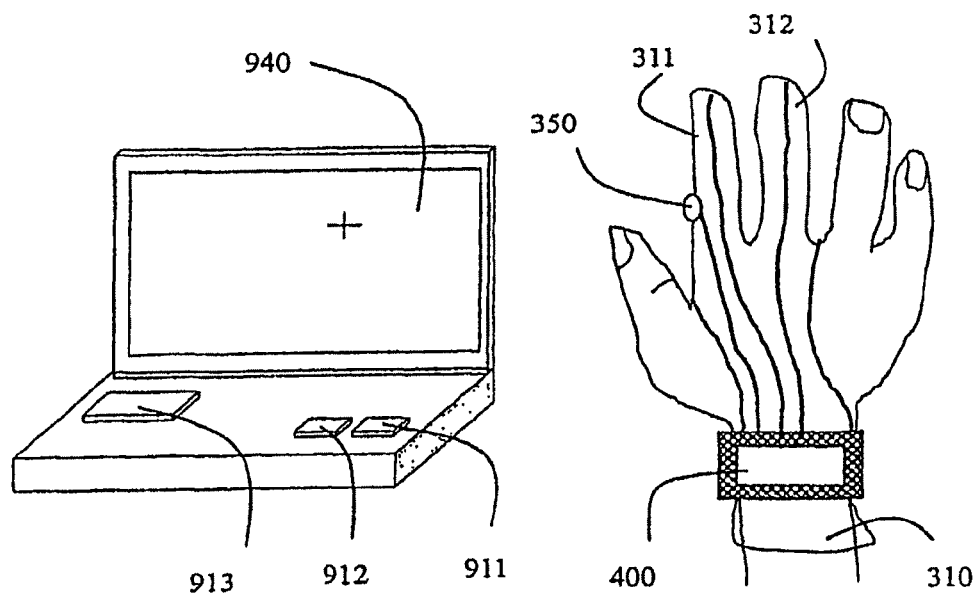
FIG. 4 is a schematic diagram of a signal input apparatus according to the present invention with a first viewing angle.
Figure 5:
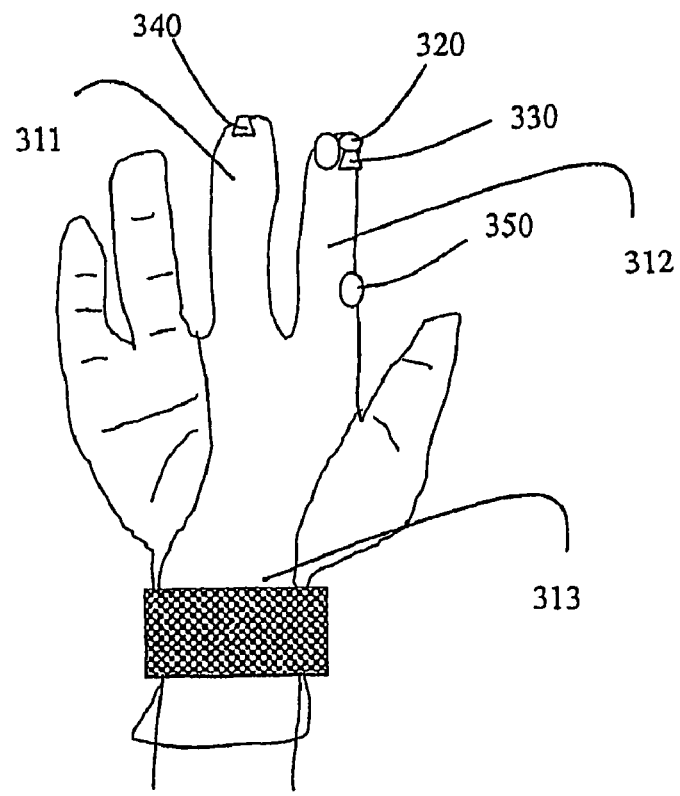
FIG. 5 is a schematic diagram of a signal input apparatus according to the present invention with a second viewing angle.

Referring to FIGS. 4 and 5, the signal input apparatus of the present invention includes a wearable unit 310, a position sensing unit 320, a first button 330, a second button 340, an input switch unit 350 and a signal processing transmission section 400. The position sensing unit 320, the first button 330, the second button 340 and the input switch unit 350 are respectively connected to the signal processing transmission section 400 via connecting wires (not numbered).

The wearable unit 310 includes a index finger sleeve 311, a middle finger sleeve 312 and a wrist section 313, and is made of flexible materials so that the signal input apparatus can be easily worn onto the operating hand of the user.

The position sensing unit 320 is located on the index finger sleeve 311 of said wearable unit for detecting the movements of the index finger with a non-mechanical-contacting manner and generating a position signal correspondingly; it can be implemented with the principle of optical scanning or the principle of magnetic field inducing, that is to say, a magnetic inducing element or an optical scanning element or a capacitance element can be used.

The first and second buttons 330 and 340 are respectively located on the index finger sleeve 311 and the middle finger sleeve 312. The first button 330 can replace the left input button of the mouse, which is generally used for operations such as confirmation and selection. The second button 340 acts as the right input button of the mouse, which is generally used for operations such as cancellation and release. The first button 330 and the second button 340 may be general contacting or sensing buttons.

The input switch unit 350 is located on the edge of the index finger sleeve 311 of the wearable unit and is connected to the signal processing transmission section 400 for turning the signal input apparatus on/off.

The signal processing transmission section 400 is located on the wrist section 313 of the wearable unit for processing data transmitted through the connecting wires and then transmitting the processed data.

The operation procedure of the signal input apparatus according to the present invention is as follows. When the tip of the finger is moved on a desktop or other flat surface, the position sensing unit 320 on the index finger sleeve 311 senses the movement of the finger, generates relative displacements on X-Y axes, and transmits to the signal processing transmission section 400. The signal processing transmission section 400 transmits the displacement signal to a wireless receiver 910 inside a computer. The wireless receiver 910 forwards the signal to a keyboard controller 920. The keyboard controller 920 informs an operation system run by a central processing unit 930 to process a cursor displacement and to display it on a screen 940.

When the index finger knocks at the first button 330, the signal processing transmission section 400 transmits a button signal to the computer. Generally, the first button 330 acts as the left input button of the mouse for operations such as confirmation and selection. When the middle finger knocks at the second button 340, the signal processing transmission section 400 transmits a button signal to the computer. Generally, the second button 340 acts as the right input button of the mouse for operations such as cancellation and release.

It is to be further described that only when the signal input switch unit 350 on the index finger sleeve 311 turns on, the signal input apparatus of the present invention can be normally operated as a mouse. When the signal input apparatus is not used, the signal input switch unit 350 needs to be turned off; otherwise, a malfunction of the mouse cursor is prone to occur when the hand touches other surfaces, for example, holding a cup for drink or answering a telephone call. The signal input switch unit 350 can be a change-over switch, i.e., as pressing once, turning the signal input apparatus on, and as pressing once more, turning the signal input apparatus off, and can be switched interlinked with other input devices. The signal input switch unit 350 is operated by the thumb with the shortest distance.

Figure 6:
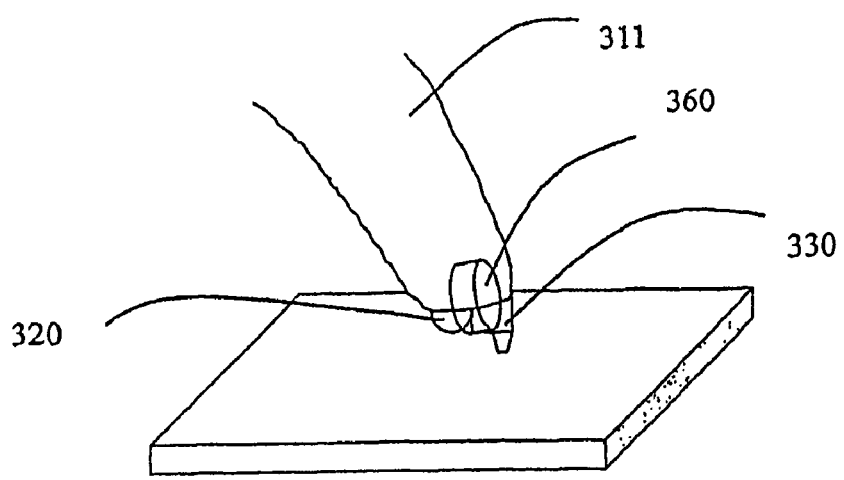
FIGS. 6 and 7 are schematic diagrams showing the arranging of a wheel onto the index finger sleeve according to the present invention.
Figure 7:
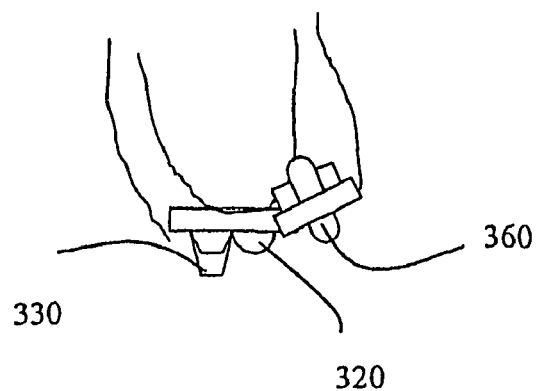

Referring to FIGS. 6 and 7, if necessary, a page unit 360 for scroll back and forth can be provided in the index finger sleeve 311, as a page up/down operation button.

The page unit 360 is located at the side section of the index finger sleeve 311, and thus when performing the displacement operation or left/right button operation, the page unit 360 is hung up and will not be scrolled; when the page unit 360 is to be used, the index finger slightly tilts to one of the sides to perform the wheel operation; when the index finger tilts, because the position sensing unit 320 is deviated from the desktop and thus automatically stops the position sensing actions, thus the malfunction of the mouse cursor can be prevented while performing the wheel operation. It can be understood that the page unit 360 can also be located on other finger such as the middle finger or the ring finger, which may reduce the burden of the index finger.

For facilitating the understanding of the present invention, the present invention will be described in detail in conjunction with the embodiments thereof.

Embodiment 1

Figure 8:
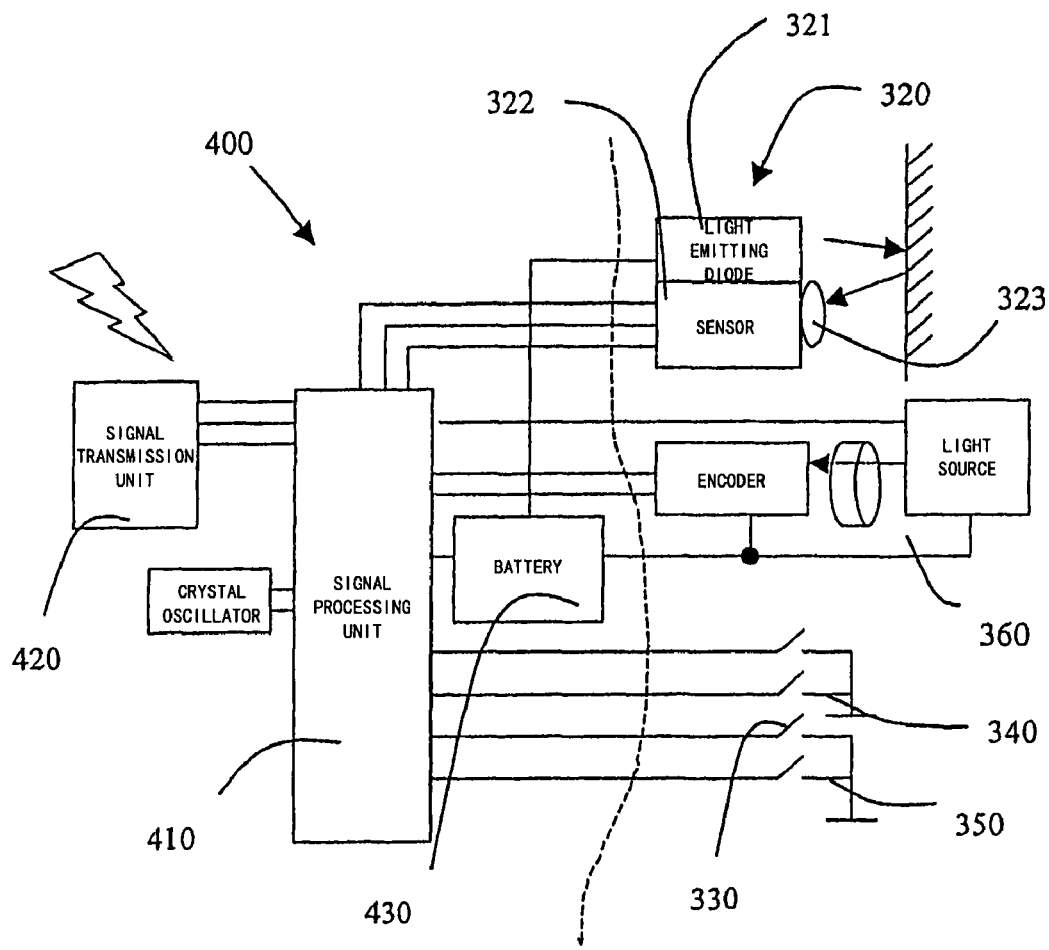
FIG. 8 is a block diagram of a signal input apparatus according to a first embodiment of the present invention.

Referring to FIG. 8, in the present embodiment, the signal input apparatus includes a signal processing transmission section 400 located on the wrist and a first button 330, a signal input switch unit 350, a second button 340, a page unit 360 and a position sensing unit 320 located on the fingers, and further includes connecting wires (not shown) for connecting these elements.

The signal processing transmission section 400 includes a signal processing unit 410, a signal transmission unit 420 and a battery 430. The signal transmission unit 420 uses wireless or infrared signals.

The first button 330, the second button 340 and the signal input switch unit 350 may use buttons from Omron Corporation, and are respectively connected to the signal processing unit 410 through connecting wires.

The position sensing unit 320 includes a light emitting diode 321, a sensor 322 and a lens 323.

The lens 323 may be HDNS2100 recommended by Agilent, and the light emitting diode 321 for illuminating the sensor 322 may be HLMPED800-XX000LED.

In the present embodiment, the sensor 322 can be a displacement sensor for an optoelectronic mouse commonly used nowadays, such as S2030 provided by Agilent, can correctly sense the X-Y displacements and has a driver for LED. The wireless section can use the chip provided by Agilent or the chip matching with ADNS-2030.

Because the conventional chips for the optoelectronic mouse produced by Agilent such as S2599 integrates both the sensor and the processing chip together, they will be too large to be located on the tip of the finger. Therefore, the present embodiment uses S2030 provided by Agilent to separate the sensor and the processing chip. The sensor is located on the tip of the finger, and the processing chip is the signal processing section 410 located on the wrist. The sensor and the processing chip are connected with wires.

Figure 9:
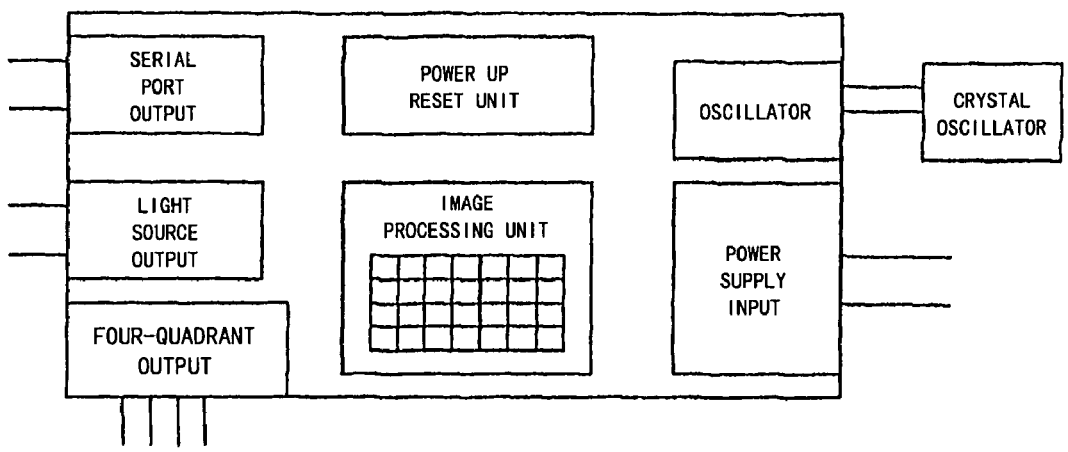
FIG. 9 is an internal block diagram of the position sensing unit shown in FIG. 8.

Referring to FIG. 9, an internal block diagram of the chip ADNS-2030 provided by Agilent is shown. It includes power supply input pins, light source output pins, an image processing unit, serial port output pins, four-quadrant output pins, an oscillator and a power-up reset unit.

On the basis of the internal block diagram of the chip shown in FIG. 9, the present embodiment tries to reduce the volume of the sensor 322 as follows: removing a part of the four-quadrant output part circuit from the sensor, and removing two internal reference pins to only remain the serial port output pins. Thus, the total number of the pins of the chip is about 9, i.e., power supply Vdd, ground Gnd, two serial port output pins, two oscillator pins, one LED resistor terminal pin, one LED output control pin and one power supply control pin.

Figure 10:
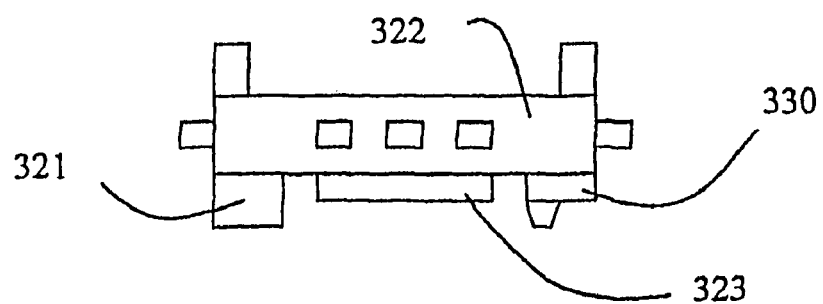
FIG. 10 is a schematic diagram of the structure of the position sensing unit shown in FIG. 8.

Referring to FIG. 10, in the present embodiment, the first button 330 located on the index finger sleeve 311 as well as the light emitting diode 321, the lens 323 are also integrated into the package of the chip for sensor 322, the resistors and crystal oscillator are located peripherally on the chip, and the middle portion is operated by the tip of the index finger.

Figure 11:
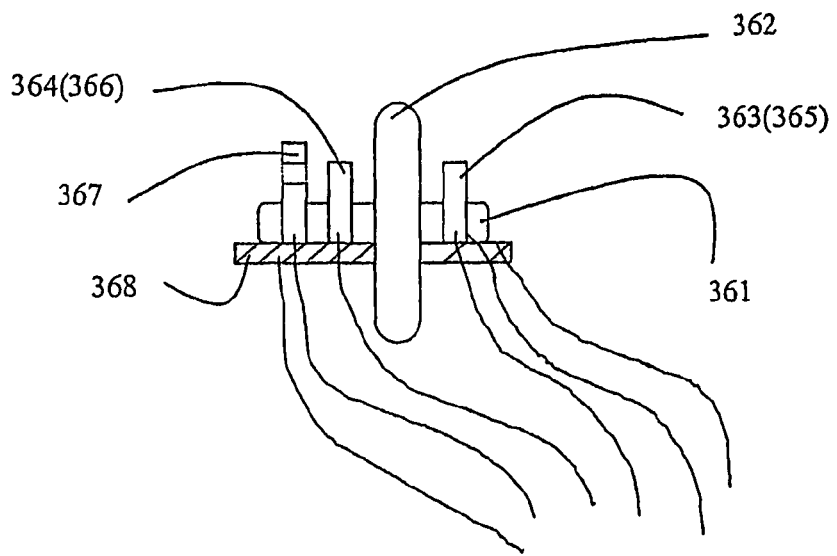
FIG. 11 is a schematic diagram of the page unit shown in FIG. 8.
Figure 12:
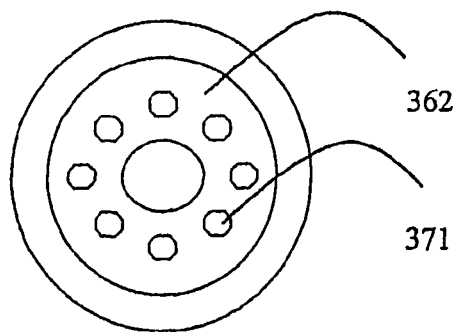
FIG. 12 is a schematic diagram of the front side of the wheel.

Referring to FIGS. 11 and 12, the page unit 360 includes a wheel shaft 361, a wheel 362, cradles 363 and 364 for supporting the wheel shaft 361 and the wheel 362, a circular optical encoder 365, a light source 366, a third button 367 and a printed circuit board 368. The basic principle is in that the wheel 362 rolls due to frictions with the desktop, and thus causes through holes 371 thereon to roll together. When light beam passes through the through holes 371, the optical encoder 365 receives the light and then generates a signal. When the wheel 362 rolls by a certain angle, the light source 366 is blocked by the wheel 362; thereby the optical encoder 365 generates a pulse signal. Therefore, the microprocessor may calculate the moved distance or rolled angle and direction of the wheel 362 according to the number of the pulse signals and the phase errors thereof.

Figure 13:
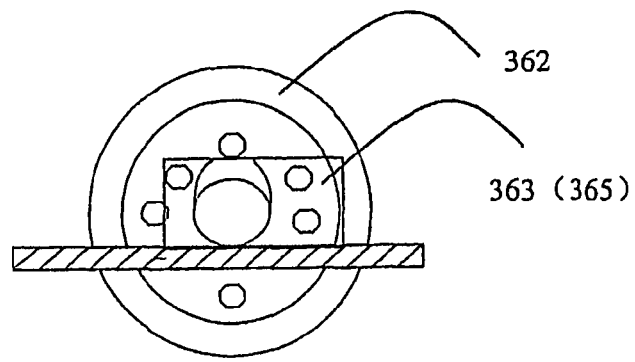
FIG. 13 is a schematic diagram of the structure of the wheel, a cradle and an encoder.

Referring to FIG. 13, in the present embodiment, in order to reduce the volume of the page unit 360 and its accessories, the wheel cradle 363 and the encoder 365 are integrally formed. The other cradle 364 on the other side of the page unit 360 and the light source 366 are integrally formed, openings are provided on the cradles 363 and 364 for seizing the wheel shaft 361 so that it can flexibly roll and also will not be easily pulled out.

Figure 14:
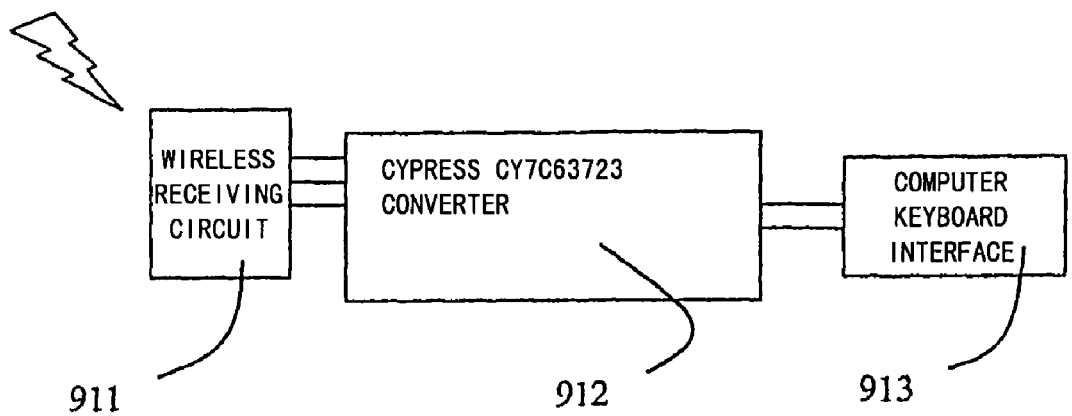
FIG. 14 is a schematic diagram of a wireless receiver interoperating with the first embodiment of the present invention.

Referring to FIG. 14, the wireless receiver 910 inside the computer includes a wireless receiving circuit 911, a converter 912 and a computer keyboard interface 913, in which the converter can be CYPRESS CY7C63723A-PC.

During operations, the sensor 322 will automatically monitor the operations of the light emitting diode 321. When the sensor 322 does not detect the displacement, the light emitting diode 321 operates in a low illumination state; and when the displacement occurs, the sensor 322 highlights the light emitting diode 321 to illuminate the surface where it is located. The sensor 322 scans once every a predetermined interval, and the signal processing unit 410 compares two adjacent scanned images so as to obtain the direction and speed of the movement of the signal input apparatus. Without doubt, if the frequency of the scan signals is higher, the signal input apparatus will be more sensitive to the movement, especially for a variable-speed movement. When the finger stops moving or leaves off the reflecting surface by a certain distance and therefore the sensor 322 cannot sense the displacement, the light emitting diode 321 is automatically controlled to be in the low illumination state. By this, the power is saved and the lifetimes of the elements are elongated.

Generally, 400 coordinates are transmitted back to the computer per one inch movement. Therefore, it has a pretty high precise. The movement data is no longer generated by mechanical frictions, so it will have no constraints on the operation surface, and thus may operate on almost all operation surfaces, such as on the leg and bed. There are no mechanical wears and tears, and the lifetimes are greatly increased.

Embodiment 2

Referring to FIG. 13, the Embodiment 2 is almost the same as the Embodiment 1 with the exception that: in Embodiment 2, the page unit 360 is located on the middle sleeve 312 of the wearable unit, and it causes the changes in the connecting wires arrangement, i.e., there are 3 wires (one for ground, one for the first button, and one for the switch) in the index finger sleeve 311, and there are 7 wires (one for the second button, and six for the page unit) in the middle finger sleeve 312. The six wires for the page unit include one for ground, one for the third button, one for the light source, one for the encoding A, one for power supply, and one for encoding B.

Similar to Embodiment 1, the page unit 360 on the middle finger sleeve 312 also tilts at a certain angle, so that it will not be touched during normal button pressing operations. The wheel 362 will contact the desktop and perform the scroll up/down operations only when the middle finger slightly tilts.

The Embodiment 2 of the present invention has the advantage as follows. The index finger is used for moving the mouse and clicking the left button, and the middle finger is used for scrolling up/down and clicking the right button, therefore, the operating burden on the index finger is reduced such that the workloads on the index finger and the middle finger are averaged in some degree, which facilitates the improvement of the working efficiency. If the page unit 360 is also located on the index finger sleeve 311, then the three functions including the movement of the mouse, the clicking of the left button, and the scrolling up/down will be all focused on the index finger, which brings about a too heavy operating burden. Certainly, if the burden of the index finger is to be reduced, the heritage of habit will be sacrificed, i.e., the user will be required to change what he used to do a little bit. The wheel is located at the middle position of the mouse and is generally operated by the index finger used according to current mouse using habit, but now differently, it will be changed to be operated by the middle finger and the user may slight do not get used to this.

Embodiment 3

Referring to FIG. 14, in the present embodiment, the light emitting diode 321, the lens 323 and the sensor 322 are integrated at the wrist. Tow optical fibers 324 are added into the position sensing unit, one for the light source and the other for signal backward transmission. These two fibers are located on the index finger and connected to the portion located on the wrist.

During operations, the optical fiber 324 guides the light beam emitted by the light emitting diode 321 to the tip of the finger, and the signal reflected by the desktop is transmitted back to the sensor 322 of the chip via the optical fiber 324.

Figure 15:
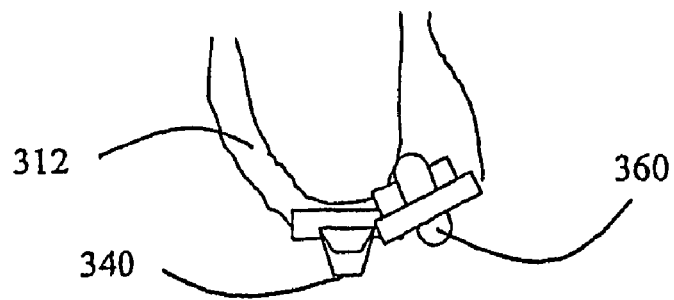
FIG. 15 is a schematic diagram of arrangement of a wheel into the middle finger sleeve according to a second embodiment of the present invention.
Figure 16:
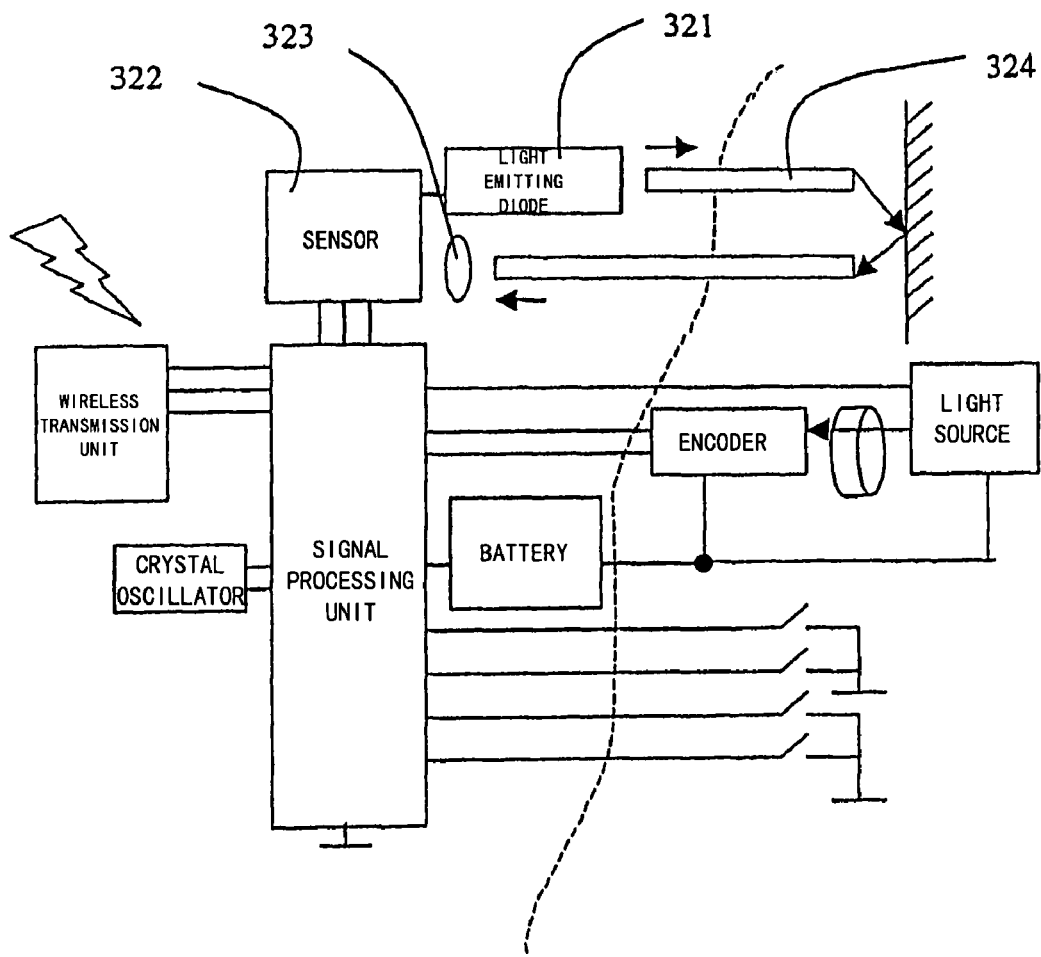
FIG. 16 is a block diagram of a signal input apparatus according to a third embodiment of the present invention.
Figure 17:
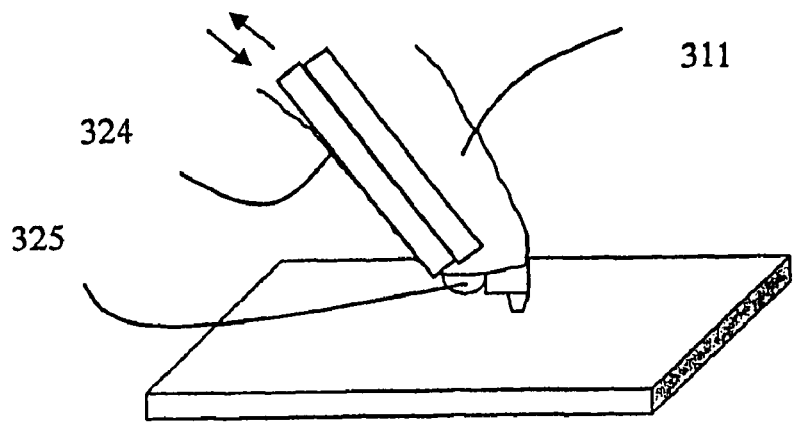
FIG. 17 is a schematic diagram of the index finger sleeve in the third embodiment of the present invention.

Referring to FIG. 15, for enhancing the light condensing, one lens 325 can be located on the index finger sleeve 311.

Aforementioned are the preferred embodiments of the present invention. It should be noticed that those skilled in the art can make changes and modifications thereto without departing from the principle of the present invention, and such changes and modifications also fall in the protection scope of the present invention.

What is claimed is:

1. A wearable signal input apparatus for a data processing system comprising:
  a wearable unit at least having an index finger sleeve and a middle finger sleeve;
  a position sensing unit located on said wearable unit for detecting a movement of the index finger and generating a corresponding displacement signal;
  a first button located on the index finger sleeve of said wearable unit for generating button signals when the index finger knocks, and a second button located on the middle finger sleeve of said wearable unit for generating button signals when the middle finger knocks;
  a signal processing unit provided on said wearable unit for receiving said displacement signal and said button signals, and converting said signals into signals which are recognizable by a data processing system;
  a signal transmission unit connected to said signal processing unit for transmitting said recognizable signals to said data processing system;
  an input switch unit provided on said wearable unit and connected to said signal processing unit for turning said signal input apparatus on/off.

2. The signal input apparatus according to claim 1, wherein said input switch unit is located at a side of the index finger sleeve of said wearable unit such that the thumb presses said input switch unit.

3. The signal input apparatus according to claim 1, wherein said position sensing unit is located on the index finger sleeve of said wearable unit, and includes a light source for generating an original light signal; a lens for acquiring a reflected light signal; a sensor for generating a position signal according to said reflected light signal, wherein the emission direction and the emission angle of the light source are just located at a position optimizing the lens' acquisition of the reflected light.

4. The signal input apparatus according to claim 3, wherein said position sensing unit and said first button are integrally packaged.

5. The signal input apparatus according to claim 1, wherein said position sensing unit includes a light source and a sensor integrated into the signal processing unit; a lens located on the index finger sleeve of the wearable unit; and optical fibers for transmitting an original light signal generated by the light source to the index finger and transmitting a reflected light signal acquired by the lens to the sensor.

6. The signal input apparatus according to claim 1, wherein said position sensing unit is a magnetic inducing element, an optical scanning sensing element or a capacitance sensing element.

7. The signal input apparatus according to claim 1, further comprising a page turning unit located on the index finger sleeve or the middle finger sleeve of said wearable unit and connected to said signal processing unit for generating a page up/down operation signal.

8. The signal input apparatus according to claim 7, wherein said page unit includes a light source, a wheel, a third button, an integrated optical encoder and a first cradle, and an integrated light source and a second cradle.

9. The signal input apparatus according to claim 8, wherein said first, second and third buttons are contacting buttons or sensing buttons.

10. The signal input apparatus according to claim 1, wherein said signal transmission unit is integrated into the signal processing unit.

11. The signal input apparatus according to claim 1, wherein said signal transmission unit is a wireless or infrared transmission unit.

12. The signal input apparatus according to claim 10, wherein said signal transmission unit is a wireless or infrared transmission unit.

* * * * *